United States Patent
Eo et al.

(10) Patent No.: US 10,693,191 B2
(45) Date of Patent: Jun. 23, 2020

(54) ELECTRODE ASSEMBLY AND RECHARGEABLE BATTERY HAVING ELECTRODE TAP

(71) Applicant: Samsung SDI Co., Ltd., Yongin-si, Gyeonggi-do (KR)

(72) Inventors: Sung-Hwa Eo, Yongin-si (KR); Seong-Gi Choo, Yongin-si (KR); Da-Woon Han, Yongin-si (KR); Jan-Dee Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 281 days.

(21) Appl. No.: 15/148,660

(22) Filed: May 6, 2016

(65) Prior Publication Data
US 2016/0329605 A1    Nov. 10, 2016

(30) Foreign Application Priority Data
May 8, 2015 (KR) .......................... 10-2015-0064728

(51) Int. Cl.
| | |
|---|---|
| *H01M 10/0587* | (2010.01) |
| *H01M 10/04* | (2006.01) |
| *H01M 2/26* | (2006.01) |
| *H01M 10/05* | (2010.01) |
| *H01M 2/36* | (2006.01) |

(52) U.S. Cl.
CPC ....... *H01M 10/0587* (2013.01); *H01M 2/263* (2013.01); *H01M 2/362* (2013.01); *H01M 10/0431* (2013.01); *H01M 10/05* (2013.01); *H01M 2220/20* (2013.01)

(58) Field of Classification Search
CPC ............ H01M 10/0587; H01M 10/05; H01M 10/0431; H01M 10/04; H01M 2/362; H01M 2/263; H01M 2/26; H01M 2/36; H01M 2/16; H01M 2/34; H01M 2220/20; H01M 10/0525; H01M 4/133; H01M 4/587; H01M 4/66
See application file for complete search history.

(56) References Cited

U.S. PATENT DOCUMENTS

| | | | | |
|---|---|---|---|---|
| 2003/0035993 | A1* | 2/2003 | Enomoto | H01M 2/0413 |
| | | | | 429/66 |
| 2010/0124694 | A1 | 5/2010 | Hikata et al. | |

(Continued)

FOREIGN PATENT DOCUMENTS

| | | | | |
|---|---|---|---|---|
| EP | 1207565 | * | 5/2002 | .............. H01M 2/26 |
| JP | 2010-118315 A | | 5/2010 | |

(Continued)

*Primary Examiner* — Jonathan G Leong
*Assistant Examiner* — Aaron J Greso
(74) *Attorney, Agent, or Firm* — Knobbe, Martens, Olson and Bear LLP

(57) ABSTRACT

An electrode assembly wound by interposing a separator between a first electrode and a second electrode according to an exemplary embodiment of the present invention is disclosed, wherein the first electrode includes a first coating part coated with an active material and a plurality of first electrode taps that are not coated with the active material and protrude to an outer side of the first coating part, and two first electrode taps per the number of three winding times are formed so as to protrude from the first electrode.

13 Claims, 10 Drawing Sheets

(56) References Cited

U.S. PATENT DOCUMENTS

| | | | | |
|---|---|---|---|---|
| 2011/0045342 A1* | 2/2011 | Dessirier | .................. | H01G 2/04 |
| | | | | 429/175 |
| 2012/0009450 A1* | 1/2012 | Chun | .................... | H01M 2/023 |
| | | | | 429/94 |
| 2012/0081839 A1* | 4/2012 | Sakurai | .................. | H01G 11/02 |
| | | | | 361/528 |

FOREIGN PATENT DOCUMENTS

| | | |
|---|---|---|
| JP | 2011-070916 A | 4/2011 |
| JP | 2013-187077 A | 9/2013 |

* cited by examiner

ELECTRODE ASSEMBLY AND RECHARGEABLE BATTERY HAVING ELECTRODE TAP

RELATED APPLICATIONS

This application claims priority to and the benefit of Korean Patent Application No. 10-2015-0064728 filed in the Korean Intellectual Property Office on May 8, 2015, the entire contents of which are incorporated herein by reference.

BACKGROUND

Field

The present invention relates to an electrode assembly and a rechargeable battery, and more particularly, to an electrode assembly and a rechargeable battery having an electrode tap.

Description of the Related Art

A rechargeable battery is a battery which may be charged and discharged, unlike a primary battery which may not be charged. A small capacity rechargeable battery may be used in a portable small electronic device such as a mobile phone, a notebook computer, and a camcorder, and a large capacity rechargeable battery may be widely used as a power supply for driving a motor of a hybrid vehicle, or the like.

A high output rechargeable battery using a non-aqueous electrolyte of high energy density has been recently developed, and the above-mentioned high output rechargeable battery is configured as the large capacity rechargeable battery by connecting a plurality of rechargeable batteries in series with each other so as to be used in driving the motor of an apparatus requiring large power, for example, an electric car, or the like.

In addition, one large capacity rechargeable battery includes the plurality of rechargeable batteries which are connected in series with each other, and the rechargeable battery may be formed in a cylindrical shape, a square shape, and the like. In addition, the rechargeable battery has an electrode assembly that performs a charging and a discharging operation, wherein the electrode assembly includes a cathode, an anode, and a separator interposed between the cathode and the anode. The electrode assembly may be formed in a structure in which a plurality of cathode plates and anode plates are stacked, or may be formed in a structure in which the cathode and the anode having a band shape are wound.

It is very important to align protruded electrode taps when the cathode, the anode, and the separator are stacked and wound, and to this end, a winding termination point and a winding start point should be accurately detected. In addition, if an interval between the electrodes is increased, charging and discharging efficiency is deteriorated.

The above information disclosed in this Background section is only for enhancement of understanding of the background of the invention and therefore it may contain information that does not form the prior art that is already known in this country to a person of ordinary skill in the art.

SUMMARY OF CERTAIN INVENTIVE ASPECTS

The present invention has been made in an effort to provide an electrode assembly having improved high-rate discharge performance and a rechargeable battery including the same.

An exemplary embodiment of the present invention provides an electrode assembly wound by interposing a separator between a first electrode and a second electrode and being wound a plurality of rotations, wherein the first electrode includes a first coating part coated with an active material and a plurality of first electrode taps that are not coated with the active material and protrude to an outer side of the first coating part, and two first electrode taps per the number of three winding rotations are formed so as to protrude from the first electrode.

When the number of winding rotations of the first electrode is k, the first electrode tap that protrudes from a 3k-2-th wound portion and the first electrode tap that protrudes from a 3k-1-th wound portion may be disposed at sides opposite to each other while having a virtual reference plane passing through the center of the electrode assembly therebetween.

When the number of winding rotations of the first electrode is k, the first electrode taps may be formed so as to protrude from only the 3k-2-th wound portion and the 3k-1-th wound portion, and the first electrode tap that protrudes from the 3k-2-th wound portion and the first electrode tap that protrudes from the 3k-1-th wound portion may be disposed so as to face each other.

When a thickness of the electrode assembly in an unfolded state is d1, a radius of a virtual circle C1 formed by the innermost surface of the first electrode is d1, and a tilt angle formed by a segment connecting a tip of the first electrode, the center of the virtual circle C1, and the center of a 1st of the first electrode taps is $\theta 1$, a distance y1 from an inner side tip of the first electrode to the first electrode tap of the 3k-2-th wound portion may satisfy the following Equation 1.

$$y1 = 2\pi r1 \cdot 3(k-1) + 2\pi d1 \times \frac{(3k-3)(3k-2)}{2} + 2\pi[r1 + (3k-2)d1]\frac{\theta 1}{2\pi} \quad \text{[Equation 1]}$$

A distance y2 from the inner side tip of the first electrode to the first electrode tap of the 3k-1-th wound portion may satisfy the following Equation 2.

$$y2 = 2\pi r1(3k-1) + 2\pi d1 \times \frac{(3k-1)3k}{2} - 2\pi[r1 + (3k-1)d1]\frac{\theta 1}{2\pi} \quad \text{[Equation 2]}$$

When the thickness of the electrode assembly in the unfolded state is d1, a radius of a virtual circle C2 formed by the innermost surface of the second electrode is r2, and a tilt angle formed by a segment connecting a tip of the second electrode, the center of the virtual circle C2, and the center of a 1st of a second electrode taps is $\theta 2$, a distance z1 from an inner side tip of the second electrode to the second electrode tap of the 3k-2-th wound portion may satisfy the following Equation 3.

$$z1 = 2\pi r2 \cdot 3(j-1) + 2\pi d1 \times \frac{(3j-3)(3j-2)}{2} + 2\pi[r2 + (3j-2)d1]\frac{\theta 2}{2\pi} \quad \text{[Equation 3]}$$

A distance z2 from the inner side tip of the second electrode to the second electrode tap of the 3k-1-th wound portion may satisfy the following Equation 4.

$$z2 = 2\pi r2(3j-1) + 2\pi d1 \times \frac{(3j-1)3j}{2} - 2\pi[r2 + (3j-1)d1]\frac{\theta 2}{2\pi}$$

Another embodiment of the present invention provides a rechargeable battery including: an electrode assembly wound by interposing a separator between a first electrode and a second electrode and being wound a plurality of rotations; and a case housing the electrode assembly, wherein the first electrode includes a first coating part coated with an active material and a plurality of first electrode taps that are not coated with the active material and protrude to an outer side of the first coating part, and two first electrode taps per the number of three winding rotations are formed so as to protrude from the first electrode.

When the number of winding rotations of the first electrode is k, the first electrode tap that protrudes from a 3k-2-th wound portion and the first electrode tap that protrudes from a 3k-1-th wound portion may be disposed at sides opposite to each other while having a virtual reference plane passing through the center of the electrode assembly therebetween.

When the number of winding times of the first electrode is k, the first electrode taps may be formed so as to protrude from only the 3k-2-th wound portion and the 3k-1-th wound portion, and the first electrode tap that protrudes from the 3k-2-th wound portion and the first electrode tap that protrudes from the 3k-1-th wound portion may be disposed so as to face each other.

When a thickness of the electrode assembly in an unfolded state is d1, a radius of a virtual circle formed by the innermost surface of the first electrode is r1, and a tilt angle formed by a segment connecting a tip of the first electrode, the center of the virtual circle, and the center of a 1st of the first electrode taps is θ1, a distance y1 from an inner side tip of the first electrode to the first electrode tap of the 3k-2-th wound portion may satisfy the following Equation 1.

$$y1 = 2\pi r1 \cdot 3(k-1) + \qquad \text{[Equation 1]}$$
$$2\pi d1 \times \frac{(3k-3)(3k-2)}{2} + 2\pi[r1 + (3k-2)d1]\frac{\theta 1}{2\pi}$$

A distance y2 from the inner side tip of the first electrode to the first electrode tap of the 3k-1-th wound portion may satisfy the following Equation 2.

$$y2 = \qquad \text{[Equation 2]}$$
$$2\pi r1(3k-1) + 2\pi d1 \times \frac{(3k-1)3k}{2} - 2\pi[r1 + (3k-1)d1]\frac{\theta 1}{2\pi}$$

When the thickness of the electrode assembly in the unfolded state is d1, a radius of a virtual circle formed by the innermost surface of the second electrode is r2, and a tilt angle formed by a segment connecting a tip of the second electrode, the center of the virtual circle, and the center of a 1st of the second electrode taps is θ2, a distance z1 from an inner side tip of the second electrode to the second electrode tap of the 3k-2-th wound portion may satisfy the following Equation 3.

$$z1 = 2\pi r2 \cdot 3(j-1) + \qquad \text{[Equation 3]}$$
$$2\pi d1 \times \frac{(3j-3)(3j-2)}{2} + 2\pi[r2 + (3j-2)d1]\frac{\theta 2}{2\pi}$$

A distance z2 from the inner side tip of the second electrode to the second electrode tap of the 3k-1-th wound portion may satisfy the following Equation 4.

$$z2 = \qquad \text{[equation 4]}$$
$$2\pi r2(3j-1) + 2\pi d1 \times \frac{(3j-1)3j}{2} - 2\pi[r2 + (3j-1)d1]\frac{\theta 2}{2\pi}$$

The rechargeable battery may be a starting battery of an engine.

According to an embodiment of the present invention, since two electrode taps are formed per the number of three winding times, the electrode taps support the electrode assembly, thereby making it possible to prevent the interval between the electrodes from being increased at the time of the swelling. In addition, since the electrode taps compress the electrodes, the electrode assembly may be easily inserted into the case. Therefore, performance of the rechargeable battery may be improved at the high-rate discharge.

DETAILED DESCRIPTION OF CERTAIN INVENTIVE EMBODIMENTS

Figure 1:
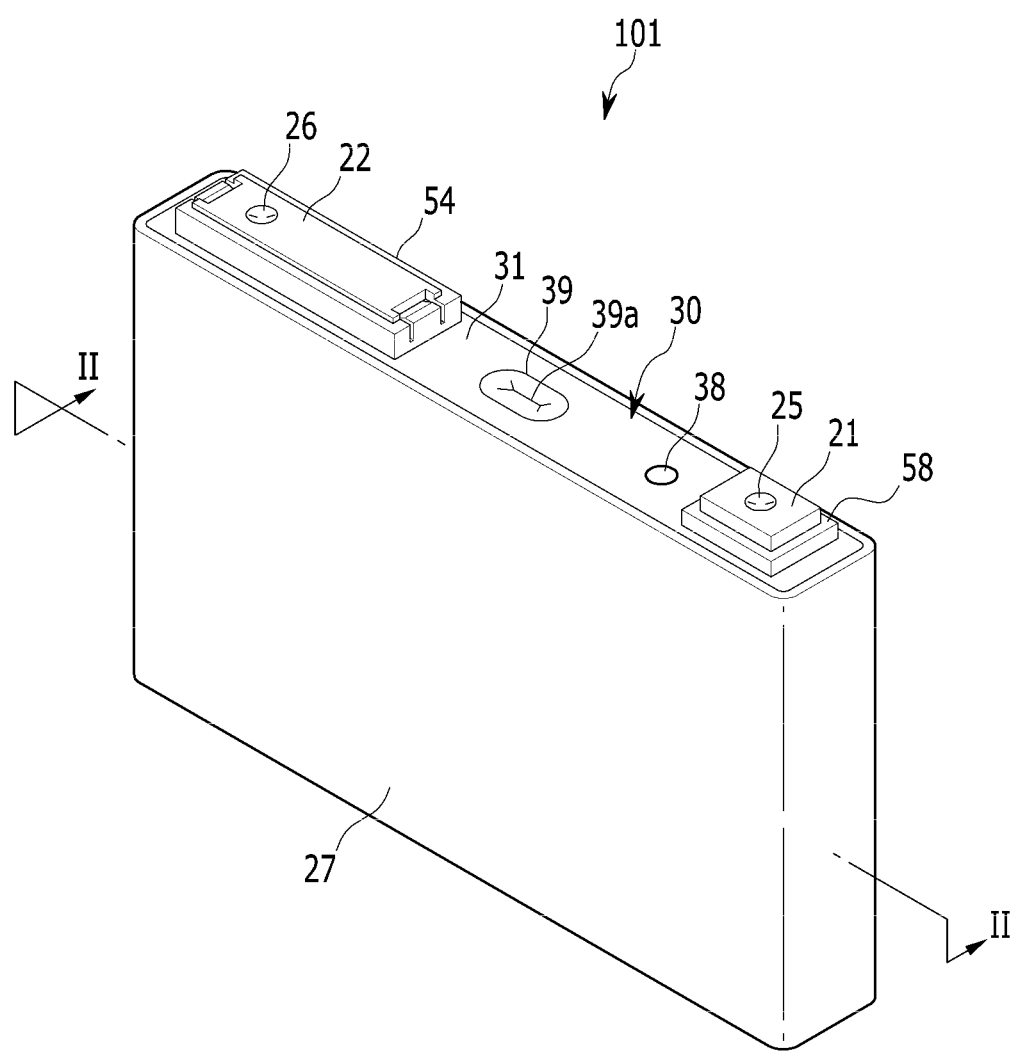
FIG. 1 is a perspective view showing a rechargeable battery according to an exemplary embodiment of the present invention.

Hereinafter, exemplary embodiments of the present invention will be described in detail with reference to the accompanying drawings so that those skilled in the art may easily practice the present invention. However, the present invention may be implemented in various different forms and is not limited to the exemplary embodiments to be described below. In addition, like reference numerals denote like components in the present specification and drawings.

Figure 2:
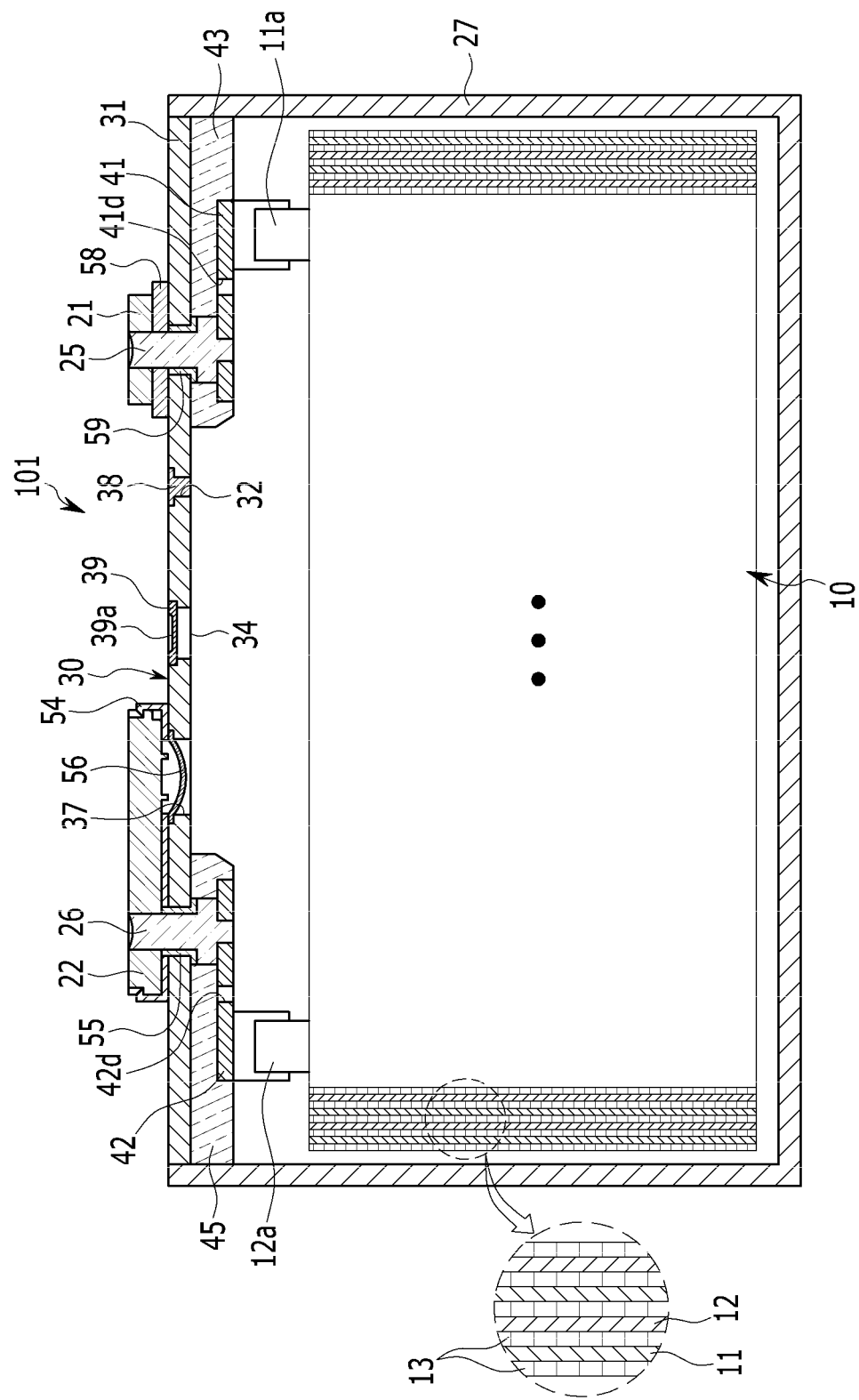
FIG. 2 is a cross-sectional view taken along a line II-II of FIG. 1.

FIG. 1 is a perspective view showing a rechargeable battery according to an exemplary embodiment of the present invention and FIG. 2 is a cross-sectional view taken along a line II-II of FIG. 1.

Referring to FIGS. 1 and 2, a rechargeable battery 101 according to an exemplary embodiment of the present invention includes an electrode assembly 10 in which a first electrode (cathode) 11 and a second electrode (anode) 12 are wound while having a separator 13 interposed therebetween, a case 27 in which the electrode assembly 10 is embedded, and a cap assembly 30 coupled to an opening of the case 27.

The rechargeable battery 101 according to the present exemplary embodiment is a lithium ion rechargeable battery and has a square shape will be described by way of example. However, the present invention is not limited thereto, but may be applied to various shapes of batteries such as a lithium polymer battery, a cylindrical battery, and the like. In addition, the rechargeable battery 101 according to the present exemplary embodiment, which is a high output square shape battery, may be particularly formed of a starting battery of a vehicle. Since the starting battery of the vehicle requires an instantaneous high output, a structure in which electrode taps upwardly protrude as in the present exemplary embodiment may be advantageous. However, in the case of the structure in which the electrode taps upwardly protrude, it is very difficult to accurately align the electrode taps. In order to accurately align the electrode taps, only if a start point of a winding and a termination position thereof are accurately determined, the electrode taps may be accurately stacked without being crossed.

The case 27 is formed in an approximately rectangular parallelepiped shape and has an opened opening formed in one surface thereof. The case 27 may be formed of a metal such as aluminum, stainless steel, or the like.

The cap assembly 30 includes a cap plate 31 covering the opening of the case 27, a first terminal 21 that protrudes to an outer side of the cap plate 31 and is electrically connected to the first electrode 11, and a second terminal 22 that protrudes to the outer side of the cap plate 31 and is electrically connected to the second electrode 12.

The cap plate 31 is formed in an elongated plate shape which is connected in one direction, and is coupled to the opening of the case 27. The cap plate 31 is installed with a sealing stopper 38 installed in an electrolyte inlet 32, and a vent plate 39 installed in a vent hole 34 and having a notch 39a formed therein so as to be opened at set pressure. The first terminal 21 and the second terminal 22 are installed so as to protrude over the cap plate 31.

The first terminal 21 is electrically connected to the first electrode 11 through a first collector member 41, and the second terminal 22 is electrically connected to the second electrode 12 through a second collector member 42. However, the present invention is not limited thereto, and for example, the first terminal 21 may also be electrically connected to an anode, and the second terminal 22 may also be electrically connected to a cathode.

The first terminal 21 may be formed in a rectangular plate shape. The first terminal 21 is electrically connected to the first electrode 11 through a connection terminal 25 bonded to the first collector member 41. The connection terminal 25 is formed in a column shape, and an upper end of the connection terminal 25 is fixed to the first terminal 21 by a welding in a state in which the connection terminal 25 is inserted into the first terminal 21. In addition, the upper end of the connection terminal 25 is fixed to the first collector member 41 by the welding, and the first collector member 41 electrically connects the connection terminal 25 and the first electrode 11.

A sealing gasket 59 for a sealing is installed so as to be inserted into a hole through which the terminal penetrates between the first terminal 21 and the cap plate 31, and a lower insulating member 43 supporting the first collector member 41 is installed below the cap plate 31.

A connection member 58 that electrically connects the first terminal 21 and the cap plate 31 is installed below the first terminal 21. Therefore, the cap plate 31 and the case 27 are charged with the cathode.

The second terminal 22 may be formed in a rectangular plate shape. The second terminal 22 is electrically connected to the second electrode 12 through a connection terminal 26 bonded to the second collector member 42. The connection terminal 26 penetrate through the cap plate 31 and the second terminal 22, such that an upper end thereof is fixed to the second terminal 22.

The connection terminal 26 is formed in a column shape, and the upper end of the connection terminal 26 is fixed to the second terminal 22 by a welding in a state in which the connection terminal 26 is inserted into the second terminal 22. In addition, the upper end of the connection terminal 26 is fixed to the second collector member 42 by the welding, and the second collector member 42 electrically connects the connection terminal 26 and the second electrode 12.

A sealing gasket 55 for a sealing is installed so as to be inserted into a hole through which the terminal penetrates between the second terminal 22 and the cap plate 31, and a lower insulating member 45 that insulates the second terminal 22 and the second collector member 42 from the cap plate 31 is installed below the cap plate 31.

Meanwhile, a short protrusion that protrudes toward a short hole 37 is formed below the second terminal 22. The second terminal 22 is formed to be long extended in one direction so as to cover the short hole 37. An upper insulating member 54 that electrically insulates the second terminal 22 and the cap plate 31 is installed between the second terminal 22 and the cap plate 31.

The cap assembly 30 includes a short member 56 that shorts the first electrode 11 and the second electrode 12, wherein the short member 56 is electrically connected to the cap plate 31 and is deformed when internal pressure of the rechargeable battery 101 is increased, so as to be connected to the second terminal 22.

The short hole 37 is formed in the cap plate 31, and the short member 56 is disposed between the upper insulating member 54 and the cap plate 31 in the short hole 37. In addition, the second terminal 22 is disposed over the short hole 37 so as to cover the short hole 37. The short member 56 includes a bending part which is downwardly and convexly bent in an arc shape, and an edge part which is formed at an outer side of the bending part and is fixed to the cap plate 31.

When gas is generated in the rechargeable battery by an extraordinary reaction, the internal pressure of the rechargeable battery is increased. If the internal pressure of the rechargeable battery is higher than preset pressure, the bending part is upwardly deformed so as to be convex, and in this case, the short protrusion and the short member 56 are in contact with each other, which cause the short.

Figure 3:
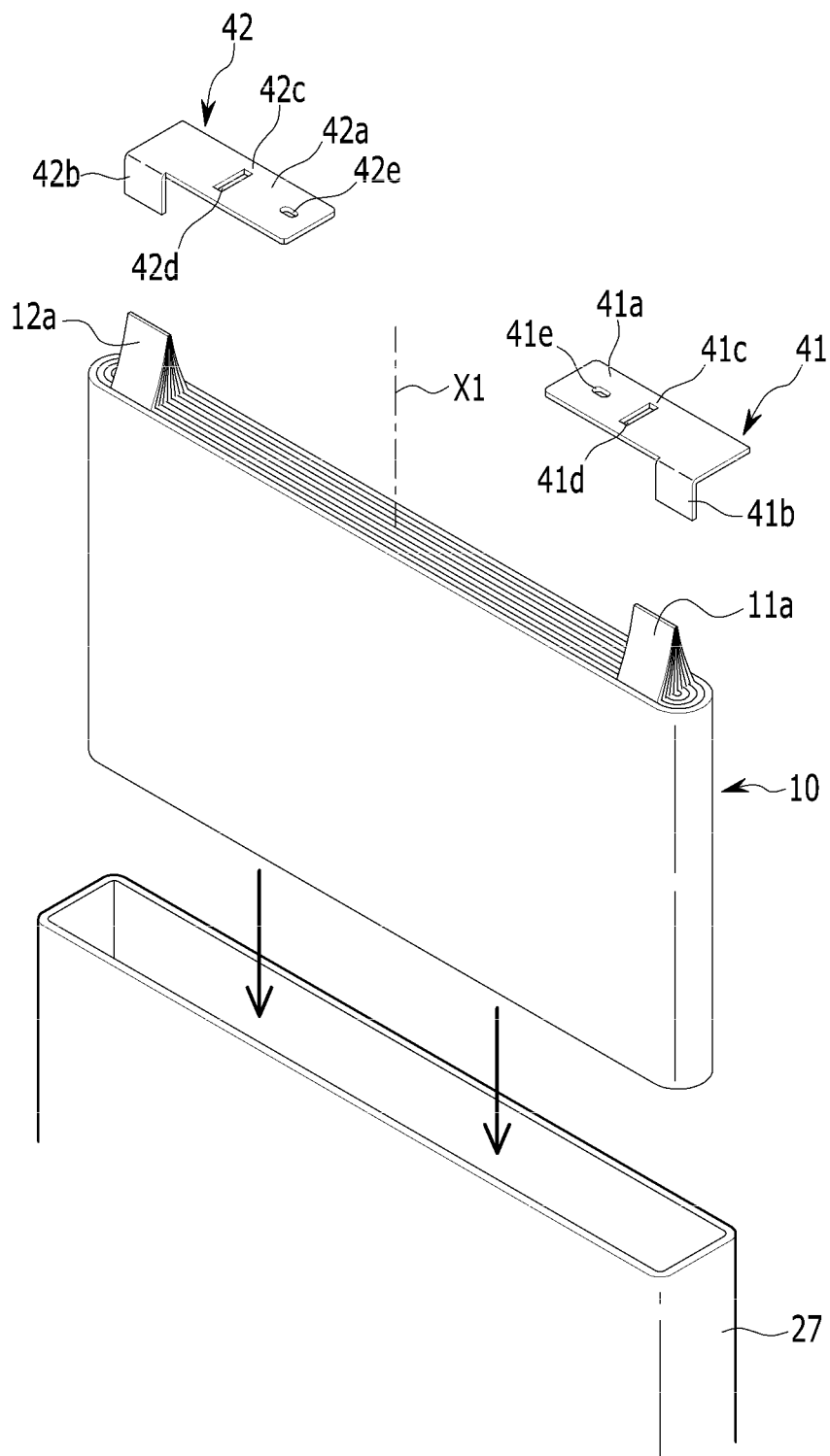
FIG. 3 is an exploded perspective view showing a portion of the rechargeable battery according to the exemplary embodiment of the present invention.

FIG. 3 is an exploded perspective view showing a portion of the rechargeable battery according to the exemplary embodiment of the present invention.

Referring to FIGS. 2 and 3, the electrode assembly 10 includes the first electrode 11 and a second electrode 12 having a band shape, and a separator 13 disposed between the first electrode 11 and the second electrode 12, and is formed of a wound structure. The electrode assembly 10 is wound around a winding axis X1 in a state in which the separator 13 is interposed between the first electrode 11 and the second electrode 12, and is then compressed to be flat. The electrode assembly 10 has one first electrode 11, one second electrode 12, and two separators 13.

The first electrode 11 includes a cathode collector and a cathode active material layer applied onto the cathode collector, wherein the cathode collector may be formed of a metal thin plate such as aluminum and the cathode active material layer may be formed of lithium based oxide. The cathode active material layer includes lithium iron phosphate (LFP), activated carbon and conductor, and a binder.

The second electrode 12 includes an anode collector and an anode active material layer applied onto the anode collector, wherein the anode collector may be formed of a metal thin plate such as copper and the anode active material layer may be formed of a carbon based active material. The anode active material layer includes softcarbon, a conductor, and a binder. The separator 13 may be formed of a porous thin film and may be formed of polyolefin based resin.

A first electrode tap 11a and a second electrode tap 12a that protrude toward the cap plate are formed on an upper end of the electrode assembly 10. The first electrode tap 11a and the second electrode tap 12a are disposed so as to be spaced apart from each other in a width direction of the electrode assembly 10.

The first collector member 41 includes an upper plate 41a bonded to the connection terminal 25 and an electrode attaching part 41b bent from the upper plate 41a to the electrode assembly 10 so as to be bonded to the first electrode tap 11a. The electrode attaching part 41b is bent at an end portion in a width direction of the upper plate 41a so as to be parallel to the electrode assembly 10.

The upper plate 41a is formed in a quadrangular plate shape and is fixed to a lower portion of the connection terminal 25 by the welding. A coupling hole 41e is formed in the upper plate 41a, and the connection terminal 25 and the upper plate 41a are welded in a state in which a protrusion formed on the lower portion of the connection terminal 25 is inserted into the coupling hole 41e.

A fuse 41c having a cross-sectional area smaller than a periphery is formed on the upper plate 41a. A fuse hole 41d is formed in the fuse 41c, such that the fuse 41c has a longitudinal section area smaller than the periphery. The fuse hole 41d is positioned at the center of the fuse 41c and the fuses 41c are formed at both side ends of the fuse hole 41d.

The second collector member 42 includes an upper plate 42a bonded to the connection terminal 26 and an electrode attaching part 42b bent from the upper plate 42a to the electrode assembly 10 so as to be directly bonded to the second electrode tap 12a. The electrode attaching part 42b is bent at an end portion in a width direction of the upper plate 42a so as to be parallel to the electrode assembly 10.

The upper plate 42a is formed in a quadrangular plate shape and is fixed to a lower portion of the connection terminal 26 by the welding. A coupling hole 42e is formed in the upper plate 42a, and the connection terminal 26 and the upper plate 42a are welded in a state in which a protrusion formed on the lower portion of the connection terminal 26 is inserted into the coupling hole 42e.

A fuse 42c having a cross-sectional area smaller than a periphery is formed on the upper plate 42a. A fuse hole 42d is formed in the fuse 42c, such that the fuse 42c has a longitudinal section area smaller than the periphery. The fuse hole 42d is positioned at the center of the fuse 42c and the fuses 42c are formed at both side ends of the fuse hole 42d.

The first electrode 11 includes a first coating part 11b in which the cathode active material layer is formed, and a first electrode tap 11a in which the cathode active material layer is not formed, wherein the first electrode tap 11a is formed of a structure in which a plurality of first electrode taps 11a are stacked. In addition, the second electrode 12 includes a second coating part 12b in which the cathode active material layer is formed, and a second electrode tap 12a in which the cathode active material layer is not formed, wherein the second electrode tap 12a is formed of a structure in which a plurality of second electrode taps 12a are stacked.

Figure 4:
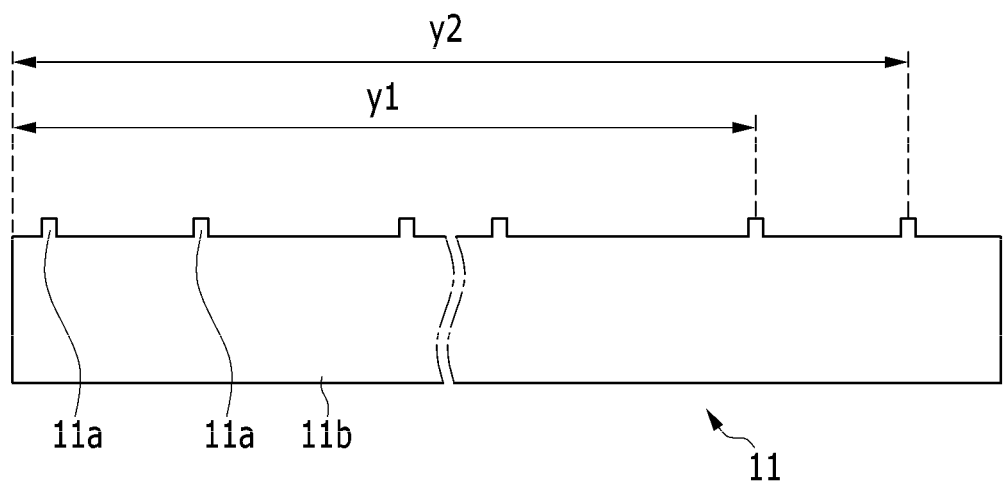
FIG. 4 is a plan view of an unfolded cathode according to an exemplary embodiment of the present invention.
Figure 5:
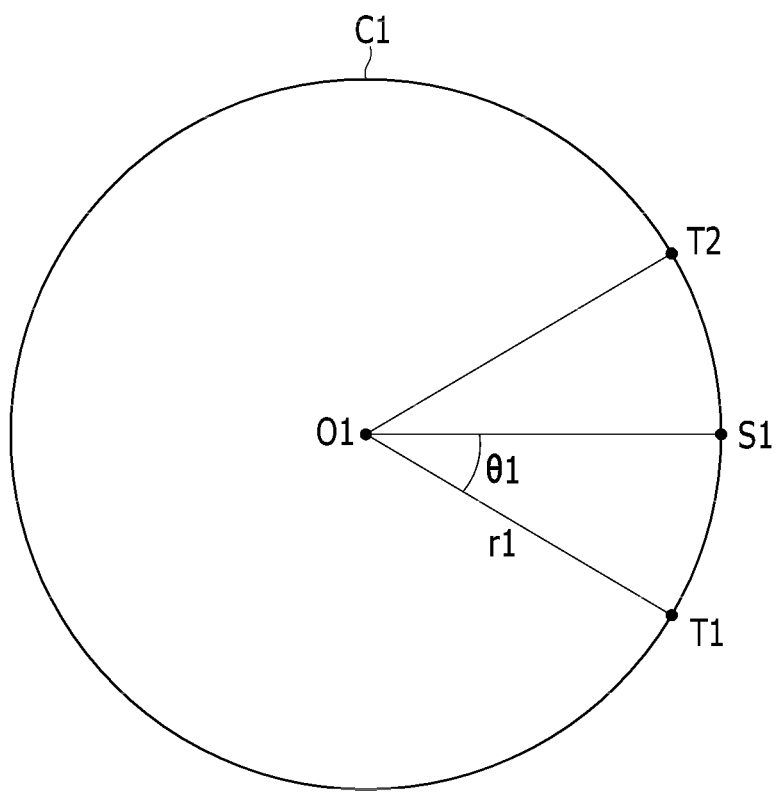
FIG. 5 is a diagram showing a virtual circle around which the cathode according to an exemplary embodiment of the present invention is wound.

FIG. 4 is a plan view of an unfolded cathode according to an exemplary embodiment of the present invention and FIG. 5 is a diagram showing a virtual circle around which the cathode according to an exemplary embodiment of the present invention is wound.

Referring to FIGS. 4 and 5, the first electrode 11 has the plurality of first electrode taps 11a formed therein, and the first electrode tap 11a upwardly protrudes from the first coating part 11b.

The plurality of first electrode taps 11a are disposed so as to be spaced from each other along a length direction of the first electrode 11, wherein two first electrode taps 11a per three winding rotations are formed so as to protrude upwards. That is, when the number of winding times of the first electrode 11 is k, the first electrode taps 11a are formed at 3k-2-th and 3k-1-th wound portions, and the first electrode tap 11a is not formed at a 3k-th wound portion. Consequently, there is not an electrode each winding rotation, but the electrodes tops are spaced such that there are two electrode tops for every 3 winding rotations.

The electrode assembly 10 may be wound along a virtual circle C1, wherein the virtual circle C1 means a circle forming the innermost surface of the first electrode 11. All of the wound first electrodes 11 have the virtual circles C1, wherein even in the case in which the electrode assembly 10 is wound not in the circular shape, but in an elliptical shape or a polygonal shape, the virtual circle may be formed by deforming the innermost surface of the wound first electrode 11 to the circle.

In addition, the center T1 of a $1^{st}$ of the first electrode taps 11a is disposed so as to form a tilt angle $\theta 1$ with a reference line connecting the center O1 of the virtual circle and an inner side tip S1 or innermost edge of the first electrode 11. That is, when a radius of the virtual circle C1 is r1 and a thickness of the electrode assembly in an unfolded state is d1, the $1^{st}$ of the first electrode taps 11a is spaced apart from the inner side tip S1 or innermost edge of the first electrode 11 by $2\pi(r1+d1)*(\theta 1/2\pi)$. The thickness d1 of the electrode assembly 10 in the unfolded state is a value obtained by summing a thickness of one first electrode 11, a thickness of one second electrode 12, and thicknesses of two separators 13.

In addition, the center T2 of a $2^{nd}$ of the first electrode taps 11a is disposed so as to form a tilt angle $-\theta 1$ with the inner side tip S1 of the first electrode 11. To this end, the $2^{nd}$ of the first electrode taps 11a is spaced apart from the inner side tip S1 of the first electrode 11 by $2\pi r+d1+2\pi(r+2d1)-2\pi(r+2d1)*(\theta 1/2\pi)$.

The center of the first electrode tap 11a that protrudes from the 3k-2-th wound portion of the first electrode 11 is positioned on a straight line connecting T1 and the center O1 of the virtual circle C1, and the center of the first electrode tap 11a that protrudes from the 3k-1-th wound portion of the first electrode 11 is positioned on a straight line connecting T2 and the center O1 of the virtual circle C1.

To this end, when the thickness of the electrode assembly 10 in the unfolded state is d1, the radius of the virtual circle C1 formed by the innermost surface of the first electrode 11 is r1, and a tilt angle formed by a segment connecting the tip S1 of the first electrode 11, the center O1 of the virtual circle C1, and the center of the $1^{st}$ of the first electrode taps 11a is θ1, a distance y1 from the inner side tip of the first electrode 11 to a 3k-2-th of the first electrode taps satisfies the following Equation 1.

$$y1 = 2\pi r1 \cdot 3(k-1) + \qquad \text{[Equation 1]}$$
$$2\pi d1 \times \frac{(3k-3)(3k-2)}{2} + 2\pi[r1+(3k-2)d1]\frac{\theta1}{2\pi}$$

In addition, a distance y2 from the inner side tip of the first electrode to the first electrode tap that protrudes from the 3k-1-th wound portion satisfies the following Equation 2.

$$y2 = \qquad \text{[Equation 2]}$$
$$2\pi r1(3k-1) + 2\pi d1 \times \frac{(3k-1)3k}{2} - 2\pi[r1+(3k-1)d1]\frac{\theta1}{2\pi}$$

Figure 6:
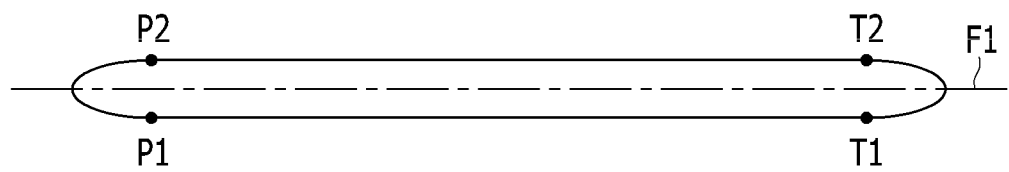
FIG. 6 is a diagram showing a state in which the virtual circle shown in FIG. 5 is flatly compressed.

As described above, in the first electrode 11 wound as shown in FIG. 6, the first electrode tap 11a that protrudes from the 3k-2-th wound portion and the first electrode tap 11a that protrudes from the 3k-1-th wound portion are disposed so as to face each other while having a virtual reference plane F1 passing through the center of the electrode assembly 10 therebetween.

According to the present exemplary embodiment, since the first electrode taps 11a are disposed at both sides so as to face each other while having the reference plane F1 therebetween, if the first electrode taps 11a are fixed to each other, the first electrode taps 11a may support the electrode assembly so that the electrode assembly is not swelled.

In addition, if the two first electrode taps 11a per the number of three winding times are formed, the first electrode tap 11a is not formed in one turn per the number of three winding times. Therefore, since the portion in which the first electrode tap 11a is not formed is supported so as to be compressed by the portion in which the first electrode tap 11a is formed, the electrode assembly 10 may be more stably supported.

Figure 7:
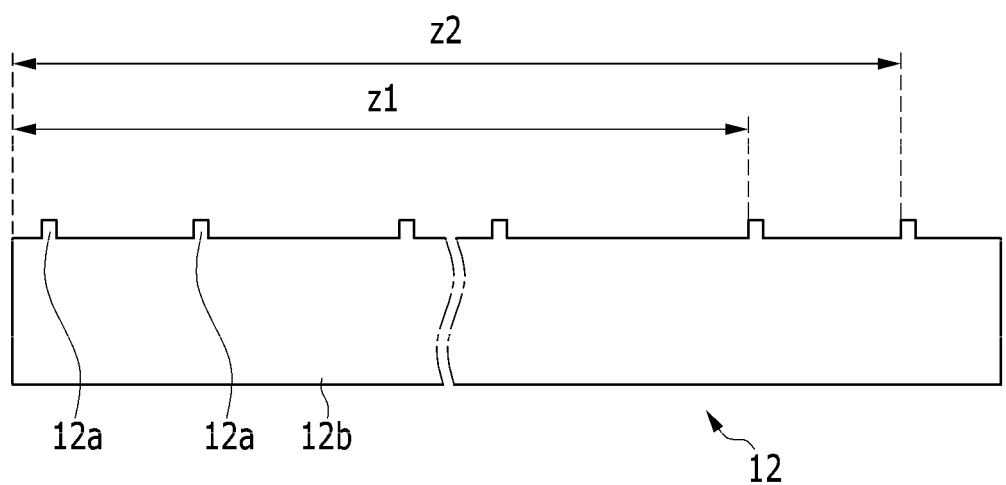
FIG. 7 is a plan view of an unfolded anode according to an exemplary embodiment of the present invention.
Figure 8:
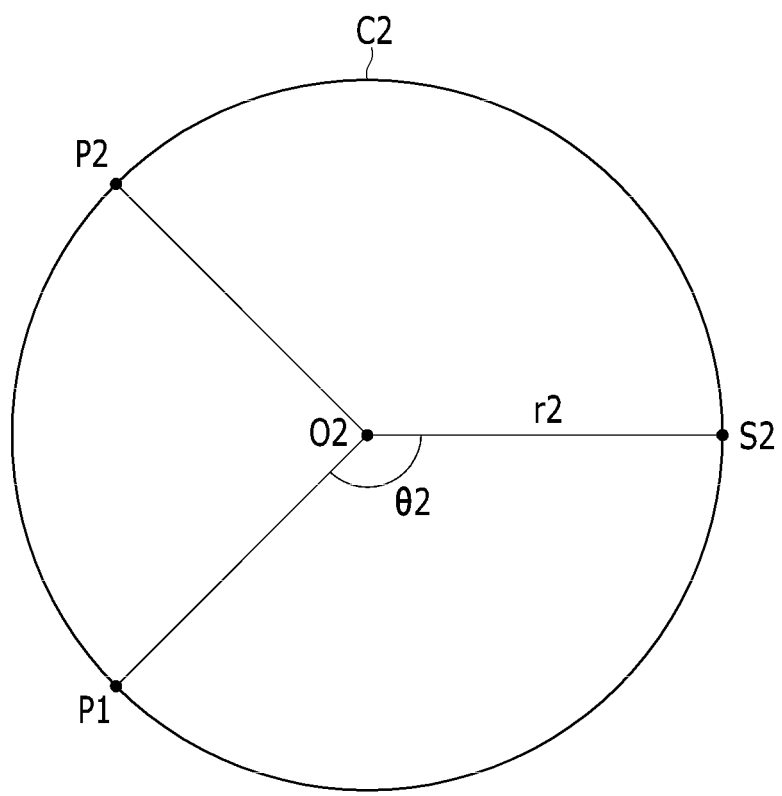
FIG. 8 is a cross-sectional view showing a virtual circle around which the anode according to the exemplary embodiment of the present invention is wound.

FIG. 7 is a plan view of an unfolded anode according to an exemplary embodiment of the present invention and FIG. 8 is a cross-sectional view showing a virtual circle around which the anode according to the exemplary embodiment of the present invention is wound.

Referring to FIGS. 7 and 8, the second electrode 12 has the plurality of second electrode taps 12a formed therein, and the second electrode tap 12a upwardly protrudes from the second coating part 12b.

The plurality of second electrode taps 12a are disposed so as to be spaced from each other along a length direction of the second electrode 12, wherein two second electrode taps 12a per the number of three winding rotations are formed so as to protrude. That is, when the number of winding times of the second electrode 12 is j, the second electrode taps 12a are formed at 3j-2-th and 3j-1-th wound portions, and the second electrode tap 12a is not formed at a 3j-th wound portion.

The second electrode 12 may be wound along a virtual circle C2, wherein the virtual circle C2 means a circle forming the innermost surface of the second electrode 12. In addition, the center P1 of a $1^{st}$ of the second electrode taps 12a is disposed so as to form a tilt angle θ2 with a reference line connecting the center O2 of the virtual circle and an inner side tip S2 or innermost edge of the second electrode 12. That is, when a radius of the virtual circle C2 is r2 and a thickness of the electrode assembly in an unfolded state is d1, the $1^{st}$ of the second electrode taps 12a is spaced apart from the inner side tip S2 or innermost edge of the second electrode 12 by 2π(r1+d1)*(θ2/2π). The thickness d1 of the electrode assembly 10 in the unfolded state is a value obtained by summing a thickness of one second electrode 12, a thickness of one second electrode 12, and thicknesses of two separators 13.

In addition, the center P2 of a $2^{nd}$ of the second electrode taps 12a is disposed so as to form a tilt angle -θ2 with the inner side tip S2 of the second electrode 12. To this end, the $2^{nd}$ of the second electrode taps 12a is spaced apart from the inner side tip S2 of the second electrode 12 by 2πr+d1+2π (r+2d1)-2π(r+2d1)*(θ2/2π).

The center of the second electrode tap 12a that protrudes from the 3j-2-th wound portion of the second electrode 12 is positioned on a straight line connecting P1 and the center O2 of the virtual circle C2, and the center of the second electrode tap 12a that protrudes from the 3j-1-th wound portion of the second electrode 12 is positioned on a straight line connecting P2 and the center O2 of the virtual circle C2.

To this end, when the thickness of the electrode assembly 10 in the unfolded state is d1, the radius of the virtual circle C2 formed by the innermost surface of the second electrode 12 is r2, and a tilt angle formed by a segment connecting the tip of second electrode 12, the center O2 of the virtual circle C2, and the center of the $1^{st}$ of the second electrode taps 12a is θ2, a distance z1 from the inner side tip of the second electrode 12 to the second electrode tap 12a that protrudes from a 3j-2-th wound portion satisfies the following Equation 3.

$$z1 = 2\pi r2 \cdot 3(j-1) + \qquad \text{[Equation 3]}$$
$$2\pi d1 \times \frac{(3j-3)(3j-2)}{2} + 2\pi[r2+(3j-2)d1]\frac{\theta2}{2\pi}$$

In addition, a distance z2 from the inner side tip of the second electrode 12 to the second electrode tap 12a that protrudes from the 3j-1-th wound portion satisfies the following Equation 4.

$$z2 = \qquad \text{[Equation 4]}$$
$$2\pi r2(3j-1) + 2\pi d1 \times \frac{(3j-1)3j}{2} - 2\pi[r2+(3j-1)d1]\frac{\theta2}{2\pi}$$

As described above, in the second electrode 12 wound as shown in FIG. 6, the second electrode tap 12a that protrudes from the 3j-2-th wound portion and the second electrode tap 12a that protrudes from the 3j-1-th wound portion are disposed so as to face each other while having a virtual reference plane F1 passing through the center of the electrode assembly 10 therebetween.

According to the present exemplary embodiment, since the second electrode taps 12a are disposed at both sides so as to face each other while having the reference plane F1 therebetween, if the second electrode taps 12a are fixed to each other, the second electrode taps 12a may support the electrode assembly so that the electrode assembly is not swelled.

In addition, if the two second electrode taps 12a per the number of three winding times are formed, the second electrode tap 12a is not formed in one turn per the number of three winding times. Therefore, since the portion in which the second electrode tap 12a is not formed is supported so as to be compressed by the portion in which the second electrode tap 12a is formed, the electrode assembly 10 may be more stably supported.

Figure 9:
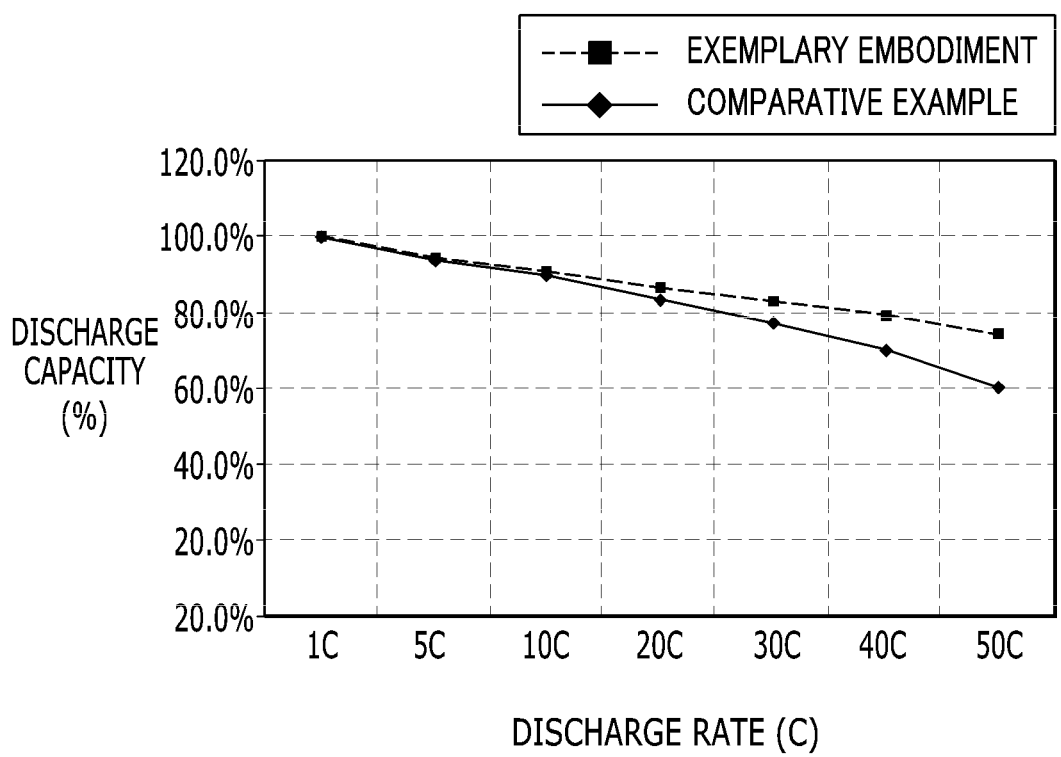
FIG. 9 is a graph illustrating a discharge rate change and discharge capacity of an exemplary embodiment of the present invention and Comparative Example.

FIG. 9 is a graph illustrating a discharge rate change and discharge capacity of an exemplary embodiment of the present invention and Comparative Example.

FIG. 9 illustrates a result obtained by performing a cut-off for a rechargeable battery having an output voltage of 3.6V and capacity of 2 Ah at 0.05C (C-rate) and then performing a high-rate discharge at 2V. The rechargeable battery according to the present exemplary embodiment has two electrode taps per three turns, and a rechargeable battery according to Comparative Example has one electrode tap per one turn.

As shown in FIG. 9, it may be appreciated that the rechargeable battery according to the present exemplary embodiment has a discharge capacity similar to Comparative Example in a low-rate discharge, but has significantly excellent discharge capacity as compared to Comparative Example in a high-rate discharge of 10C or more.

The rechargeable battery according to the present exemplary embodiment is a rechargeable battery for starting a vehicle engine, or the like, and the rechargeable battery for the starting requires the high-rate discharge. Therefore, as in the present exemplary embodiment, if the two electrode taps per the number of three winding times are formed, more excellent discharge capacity at the high-rate discharge as compared to the rechargeable batteries according to the related art may be implemented.

Figure 10:
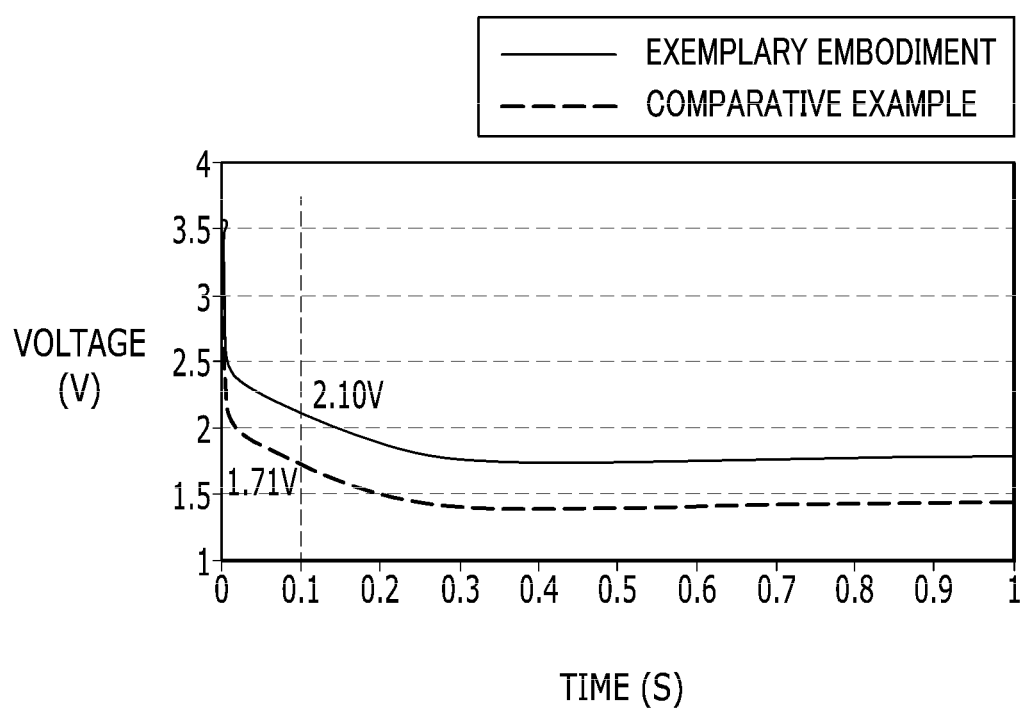
FIG. 10 is a graph illustrating a discharge rate change and a voltage at the time of a low temperature starting of an exemplary embodiment of the present invention and Comparative Example.

FIG. 10 is a graph illustrating a discharge rate change and a voltage at the time of a low temperature starting of an exemplary embodiment of the present invention and Comparative Example.

FIG. 10 illustrates a result obtained by performing a cut-off for a rechargeable battery having an output voltage of 3.6V and capacity of 2 Ah at 0.05C (C-rate), leaving the rechargeable battery at −10° C. for 1 hour, and then discharging the rechargeable battery for 1 second.

FIG. 10 illustrates low temperature startability of a starting battery, and it may be appreciated that the rechargeable battery according to the present exemplary embodiment exhibits higher voltage than the rechargeable battery according to Comparative Example until 0.1 second. In addition, the rechargeable battery according to the present exemplary embodiment generally exhibits higher voltage than the rechargeable battery according to Comparative Example for a range of 1 second. On the other hand, it may be appreciated that a voltage of the rechargeable battery according to Comparative Example is rapidly decreased within 0.1 second. The rechargeable battery according to the present invention as described above has improved high-rate discharge characteristics and low temperature starting characteristics as compared to the rechargeable battery according to the related art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrode assembly wound by interposing a separator between a first electrode and a second electrode and being wound a plurality of rotations,
    wherein the first electrode includes a first coating part coated with an active material and a plurality of first electrode taps that are not coated with the active material and protrude to an outer side of the first coating part,
    wherein the plurality of electrode taps are spaced apart such that no more than two first electrode taps per the number of three winding rotations are formed so as to protrude from the first electrode, wherein the number of electrode taps per winding rotation is calculated by starting from one of the two first electrode taps and ending with the other one of the two first electrode taps,
    wherein two of the plurality of electrode taps are disposed on opposing sides of a virtual reference plane passing through the center of the electrode assembly, and
    wherein when the number of winding rotations of the first electrode is k, the first electrode tap that protrudes from a 3k-2-th wound portion and the first electrode tap that protrudes from a 3k-1-th wound portion are disposed at the opposing sides of the virtual reference plane passing through the center of the electrode assembly.

2. The electrode assembly of claim 1, wherein:
the first electrode taps are formed so as to protrude from only the 3k-2-th wound portion and the 3k-1-th wound portion, and
the first electrode tap that protrudes from the 3k-2-th wound portion and the first electrode tap that protrudes from the 3k-1-th wound portion are disposed so as to face each other.

3. The electrode assembly of claim 1, wherein:
when a thickness of the electrode assembly in an unfolded state is d1, a radius of a virtual circle formed by the innermost surface of the first electrode is r1, and a tilt angle formed by a segment connecting a tip of the first electrode, the center of the virtual circle, and the center of a $1^{st}$ of the first electrode taps is θ1, a distance y1 from an inner side tip of the first electrode to the first electrode tap of the 3k-2-th wound portion satisfies the following Equation:

$$y1 = 2\pi r1 \cdot 3(k-1) + 2\pi d1 \times \frac{(3k-3)(3k-2)}{2} + 2\pi[r1 + (3k-2)d1]\frac{\theta 1}{2\pi}.$$

4. The electrode assembly of claim 2, wherein a thickness of the electrode assembly in an unfolded state is d1, and wherein a distance y2 from the inner side tip of the first electrode to the first electrode tap of the 3k-1-th wound portion satisfies the following Equation:

$$y2 = 2\pi r1(3k-1) + 2\pi d1 \times \frac{(3k-1)3k}{2} - 2\pi[r1 + (3k-1)d1]\frac{\theta 1}{2\pi}.$$

5. The electrode assembly of claim 3, wherein when the number of winding rotations of the second electrode is j, a radius of a virtual circle formed by the innermost surface of the second electrode is r2, and a tilt angle formed by a segment connecting a tip or edge of the second electrode, the center of the virtual circle, and the center of a $1^{st}$ of the second electrode taps is $\theta2$, a distance z1 from an inner side tip of the second electrode to the second electrode tap of the 3k-2-th wound portion satisfies the following Equation:

$$z1 = 2\pi r2 \cdot 3(j-1) + 2\pi d1 \times \frac{(3j-3)(3j-2)}{2} + 2\pi[r2 + (3j-2)d1]\frac{\theta2}{2\pi}.$$

6. The electrode assembly of claim 5, wherein a distance z2 from the inner side tip of the second electrode to the second electrode tap of the 3k-1-th wound portion satisfies the following Equation:

$$z2 = 2\pi r2(3j-1) + 2\pi d1 \times \frac{(3j-1)3j}{2} - 2\pi[r2 + (3j-1)d1]\frac{\theta2}{2\pi}.$$

7. A rechargeable battery comprising an electrode assembly wound by interposing a separator between a first electrode and a second electrode and being wound a plurality of rotations; and
  a case housing the electrode assembly,
  wherein the first electrode includes a first coating part coated with an active material and a plurality of first electrode taps that are not coated with the active material and protrude to an outer side of the first coating part,
  wherein the plurality of electrode taps are spaced apart such that no more than two first electrode taps per the number of three winding times are formed so as to protrude from the first electrode, wherein the number of electrode taps per winding times is calculated by starting from one of the two first electrode taps and ending with the other one of the two first electrode taps,
  wherein two of the plurality of electrode taps are disposed on opposing sides of a virtual reference plane passing through the center of the electrode assembly, and
  wherein when the number of winding rotations of the first electrode is k, the first electrode tap that protrudes from a 3k-2-th wound portion and the first electrode tap that protrudes from a 3k-1-th wound portion are disposed at the opposing sides of the virtual reference plane passing through the center of the electrode assembly.

8. The rechargeable battery of claim 7, wherein the first electrode taps are formed so as to protrude from only the 3k-2-th wound portion and the 3k-1-th portion, and
  the first electrode tap that protrudes from the 3k-2-th wound portion and the first electrode tap that protrudes from the 3k-1-th wound portion are disposed so as to face each other.

9. The rechargeable battery of claim 7, wherein when a thickness of the electrode assembly in an unfolded state is d1, a radius of a virtual circle formed by the innermost surface of the first electrode is r1, and a tilt angle formed by a segment connecting a tip of the first electrode, the center of the virtual circle, and the center of a $1^{st}$ of the first electrode taps is $\theta1$, a distance y1 from an inner side tip of the first electrode to the first electrode tap of the 3k-2-th wound portion satisfies the following Equation:

$$y1 = 2\pi r1 \cdot 3(k-1) + 2\pi d1 \times \frac{(3k-3)(3k-2)}{2} + 2\pi[r1 + (3k-2)d1]\frac{\theta1}{2\pi}.$$

10. The rechargeable battery of claim 9, wherein:
  a thickness of the electrode assembly in an unfolded state is d1, and
  a distance y2 from the inner side tip of the first electrode to the first electrode tap of the 3k-1-th wound portion satisfies the following Equation:

$$y2 = 2\pi r1(3k-1) + 2\pi d1 \times \frac{(3k-1)3k}{2} - 2\pi[r1 + (3k-1)d1]\frac{\theta1}{2\pi}.$$

11. The rechargeable battery of claim 9, wherein:
  when the number of winding rotations of the second electrode is j, a radius of a virtual circle formed by the innermost surface of the second electrode is r2, and a tilt angle formed by a segment connecting a tip of the second electrode, the center of the virtual circle, and the center of a $1^{st}$ of the second electrode taps is $\theta2$, a distance z1 from an inner side tip of the second electrode to the second electrode tap of the 3k-2-th wound portion satisfies the following Equation:

$$z1 = 2\pi r2 \cdot 3(j-1) + 2\pi d1 \times \frac{(3j-3)(3j-2)}{2} + 2\pi[r2 + (3j-2)d1]\frac{\theta2}{2\pi}.$$

12. The rechargeable battery of claim 11, wherein:
  a distance z2 from the inner side tip of the second electrode to the second electrode tap of the 3k-1-th wound portion satisfies the following Equation:

$$z2 = 2\pi r2(3j-1) + 2\pi d1 \times \frac{(3j-1)3j}{2} - 2\pi[r2 + (3j-1)d1]\frac{\theta2}{2\pi}.$$

13. The rechargeable battery of claim 7, wherein the rechargeable battery is a starting battery of an engine.

* * * * *